US012782755B2

(12) United States Patent
Li

(10) Patent No.: US 12,782,755 B2
(45) Date of Patent: Nov. 3, 2026

(54) HINGE STRUCTURE OF SMART GLASSES

(71) Applicant: GOERTEK INC., Weifang (CN)

(72) Inventor: Chuanlong Li, Weifang (CN)

(73) Assignee: Goertek Inc., Weifang (CN)

( * ) Notice: Subject to any disclaimer, the term of this patent is extended or adjusted under 35 U.S.C. 154(b) by 337 days.

(21) Appl. No.: 18/688,136

(22) PCT Filed: Aug. 29, 2022

(86) PCT No.: PCT/CN2022/115549
§ 371 (c)(1),
(2) Date: Feb. 29, 2024

(87) PCT Pub. No.: WO2023/030262
PCT Pub. Date: Mar. 9, 2023

(65) Prior Publication Data

US 2024/0402516 A1 Dec. 5, 2024

(30) Foreign Application Priority Data

Aug. 31, 2021 (CN) .......................... 202111011826.4

(51) Int. Cl.
*G02C 5/22* (2006.01)

(52) U.S. Cl.
CPC ......... *G02C 5/2236* (2013.01); *G02C 5/2281* (2013.01); *G02C 2200/24* (2013.01)

(58) Field of Classification Search
None
See application file for complete search history.

(56) References Cited

U.S. PATENT DOCUMENTS 5,258,784 A * 11/1993 Baines .................... G02C 5/14 351/124
8,627,546 B2 * 1/2014 Zhang .................. H04M 1/022 16/371
2012/0120618 A1 * 5/2012 Bohn .................... H04M 1/022 361/679.01
2012/0257368 A1 * 10/2012 Bohn .................... H04M 1/022 16/319
2023/0063509 A1 * 3/2023 Wang .................. G02C 5/2254
2023/0324716 A1 * 10/2023 Wienicke ............. G02C 5/2227 351/153

FOREIGN PATENT DOCUMENTS

CN 110609395 A 12/2019
CN 111562675 A 8/2020
WO WO 2020/124352 A1 6/2020

* cited by examiner

*Primary Examiner* — Robert E. Tallman
(74) *Attorney, Agent, or Firm* — Baker Botts LLP

(57) ABSTRACT

A hinge structure of smart glasses is provided, comprising several hinge frames provided along a pre-set direction, adjacent hinge frames are hinged by a hinged shaft; the hinged shaft is provided with a reset assembly, and after the hinge frame at one end swings to a pre-set angle toward a pre-set outward flipping direction relative to the hinge frame at the other end, the reset assembly provides a reset force to the hinge frame, so that the corresponding hinge frame has a motion tendency opposite to the pre-set outward flipping direction; the hinged shaft is provided with a damping elastic piece, and the damping elastic piece presses against at least one hinge frame so as to provide a damping force thereto when the corresponding hinge frame swings.

9 Claims, 12 Drawing Sheets

HINGE STRUCTURE OF SMART GLASSES

CROSS-REFERENCE TO RELATED APPLICATIONS

The present disclosure is a National Stage of International Application No. PCT/CN2022/115549, filed on Aug. 29, 2022, which claims priority to a Chinese patent application No. 202111011826.4 filed with the CNIPA on Aug. 31, 2021 and entitled "HINGE STRUCTURE OF SMART GLASSES", which is hereby incorporated by reference in its entirety.

TECHNICAL FIELD

The present disclosure relates to the field of wearable device, and particularly to a hinge structure of smart glasses.

BACKGROUND

In some existing smart eyeglasses, an eyeglass temple is hinged to an eyeglass frame through a hinge structure formed by a plurality of plates which are sequentially hinged, so as to realize the folding of the eyeglass temple. Wherein, the plate is provided with an elastic strip, and when the eyeglass temple is opened for wearing in an outward flipping direction with respect to an eyeglass frame, the free end of the elastic strip on the plate deforms against the plate to provide the eyeglass temple with a reset force along an inward folding direction, so that the eyeglass temple is pressed toward the head, thereby improving wearing reliability. In addition, in order to improve use feeling, a damping piece is provided between the adjacent plates to provide a damping force.

However, since the elastic strip and damping piece are installed at different positions of the hinge structure and are scattered, each of these parts need to be positioned on the hinge structure separately, causing inconvenience in the assembly.

Therefore, how to facilitate the assembly of a hinge structure is a technical problem that those skilled in the art need to solve at present.

SUMMARY

In view of the above, an objective of the present disclosure is to provide a hinge structure of smart glasses, which facilitates the assembly.

To achieve the above objective, the present disclosure provides the following technical solution:

A hinge structure of smart glasses, comprising several hinge frames provided along a pre-set direction, adjacent hinge frames are hinged by a hinged shaft;

the hinged shaft is provided with a reset assembly, and after the hinge frame at one end of the hinge shaft swings to a pre-set angle toward a pre-set outward flipping direction relative to the hinge frame at the other end of the hinge shaft, the reset assembly provides a reset force to the hinge frame, so that the corresponding hinge frame has a motion tendency opposite to the pre-set outward flipping direction;

the hinged shaft is provided with a damping elastic piece, and the damping elastic piece presses against at least one hinge frame so as to provide a damping force thereto when the corresponding hinge frame swings.

Preferably, a pressing force of the damping elastic piece pressing against the corresponding hinge frame is adjustable.

Preferably, at least one pair of adjacent hinge frames are respectively fixed with a mounting plate to form a plate group, the hinged shaft is plugged along an axial direction into each mounting plate, and the damping elastic piece presses against at least two adjacent mounting plates which are respectively connected with two hinge frames.

Preferably, one end of the hinged shaft in the axial direction is provided with an end cap, and the damping elastic piece is positioned in the axial direction between one end of the plate group and the end cap; an axial spacing between the end cap and the plate group is adjustable.

Preferably, the other end of the hinged shaft in the axial direction is a threaded rod which is screwed to a lock nut, and the plate group is sandwiched between the lock nut and the end cap.

Preferably, between the at least one pair of adjacent hinge frame, all mounting plates in the plate group are divided into two plate sub-groups which are provided at two ends of the hinge frame in the axial direction, and the reset assembly is provided between the two plate sub-groups.

Preferably, in the at least one pair of adjacent hinge frame, one hinge frame is fixedly connected with the hinged shaft, the reset assembly comprising: a fixed block fixed to the other hinge frame, a movable block connected with the hinged shaft in an axially sliding manner, and a reset elastic piece for axially pressing the movable block against the fixed block; and after the hinge frame at one end of the hinge shaft swings to the pre-set angle toward the pre-set outward flipping direction relative to the hinge frame at the other end of the hinge shaft, the movable block, by fitting engagement with a slope between the movable block and the fixed blocks, enables a corresponding hinge frame to have a motion tendency opposite to the pre-set outward flipping direction.

Preferably, the fixed block comprises a fixed flat surface perpendicular to the axial direction, and the movable block comprises a movable flat surface perpendicular to the axial direction; in an extreme inward folding state, the fixed flat surface and the movable flat surface are correspondingly abutted along the axial direction.

Preferably, further comprising ring-shaped hinge covers, an outer side of each hinge frame is respectively sleeved and fixed with one hinge cover, and all the hinge covers are connected along the pre-set direction to form a mounting passage.

Preferably, the hinge frame is provided with an axial trough, the hinged shaft being inserted into the axial trough and fixedly connected thereto by interference fit.

The hinge structure of smart glasses provided by the present disclosure comprises several hinge frames provided along a pre-set direction, adjacent hinge frames are hinged by a hinged shaft; the hinged shaft is provided with a reset assembly, and after the hinge frame at one end of the hinge shaft swings to a pre-set angle toward a pre-set outward flipping direction relative to the hinge frame at the other end of the hinge shaft, the reset assembly provides a reset force to the hinge frame, so that the corresponding hinge frame has a motion tendency opposite to the pre-set outward flipping direction; the hinged shaft is provided with a damping elastic piece, and the damping elastic piece presses against at least one hinge frame so as to provide a damping force thereto when the corresponding hinge frame swings.

In the hinge structure, the reset assembly and the damping elastic piece are uniformly provided on the hinged shaft, and thus can be directly positioned at the hinged shaft, which can be uniformly installed to facilitate the assembly of the hinged structure.

BRIEF DESCRIPTION OF THE DRAWINGS

In order to more clearly illustrate the embodiments of the present disclosure or the technical solutions in the prior art, accompanying drawings that need to be used in the embodiments or the prior art will be briefly introduced as follows. Obviously, drawings in following description are only a part of the present disclosure. For those skilled in the art, other drawings can also be obtained according to the disclosed drawings without creative efforts.

Figure 1:
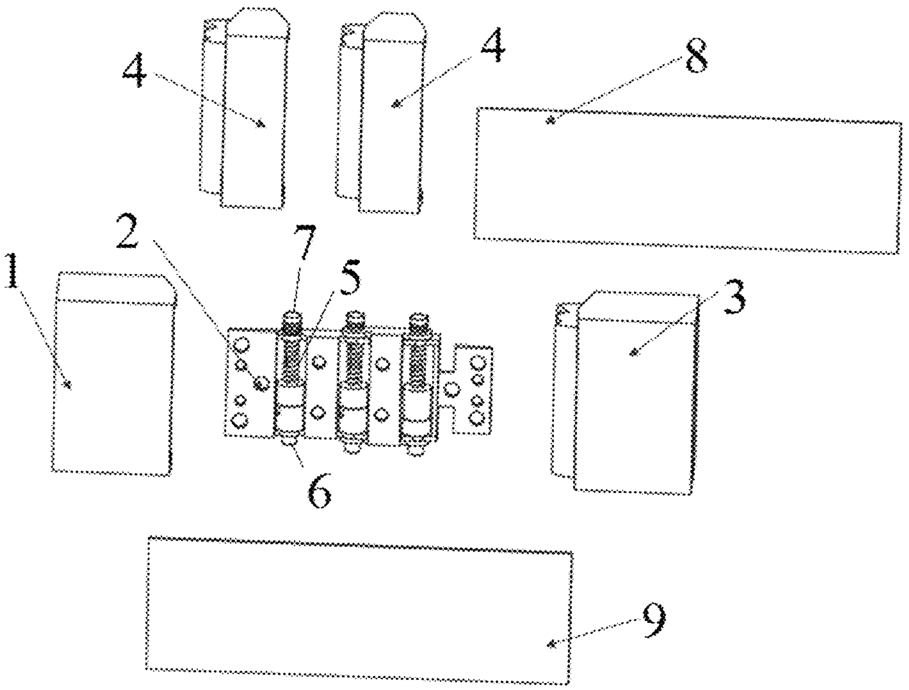
FIG. 1 is an exploded view of a first specific embodiment of a hinge structure provided by the present disclosure.
Figure 2:
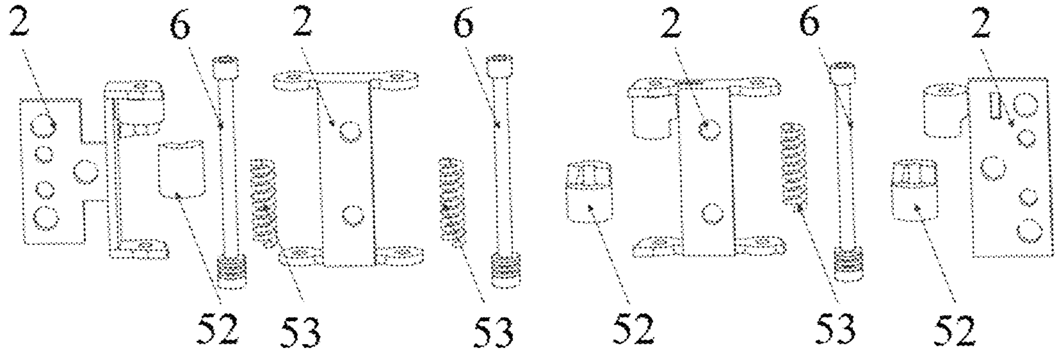
FIG. 2 is a first exploded view of various hinge frame connecting structures in the first specific embodiment of the hinge structure provided by the present disclosure.
Figure 3:
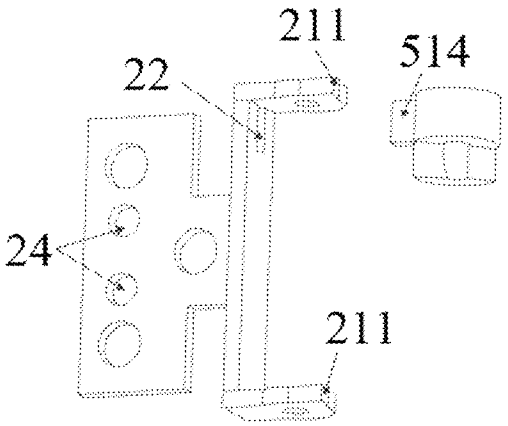
FIG. 3 is an exploded view of an end hinge frame in the first specific embodiment of the hinge structure provided by the present disclosure.

DESCRIPTION OF REFERENCE SIGNS eyeglass frame 1;

hinge frame 2, mounting plate 21, outer restraining surface 211, positioning groove 22, screw hole 23, positioning hole 24, plate sub-group 25, connecting hole 26;

eyeglass temple 3;

hinge cover 4, connecting recess 41, outer positioning surface 42, connecting convex 43, inner positioning surface 44, second side plate 5, mounting passage 46, screw post 47, positioning post 48, first side plate 49, plug structure 491, axial trough 492;

reset assembly 5, fixed block 51, fixed flat surface 511, fixed slope 512, fixed inner positioning surface 513, positioning bar 514, movable block 52, movable flat surface 521, movable slope 522, movable inner positioning surface 523, reset elastic piece 53;

hinged shaft 6, gasket 61, end cap 62, lock nut 63;

damping elastic piece 7;

flexible circuit board 8;
flexible thermally conductive material 9.

DETAILED DESCRIPTION

The technical solutions in the embodiments of the present disclosure will be described below with reference to the drawings in the embodiments of the present disclosure. Obviously, the described embodiments are only a part of the embodiments of the present disclosure, and not all of the embodiments. Based on the embodiments in the present disclosure, all other embodiments obtained by a person of ordinary skill in the art without making creative labor fall within the scope of protection of the present disclosure.

A core of the present disclosure is to provide a hinge structure of smart glasses, which facilitates the assembly.

A first specific embodiment of a hinge structure of smart glasses (hinge structure) of the present disclosure, please refer to FIGS. 1-28, comprises several hinge frames 2 provided along a pre-set direction, and adjacent hinge frames 2 are hinged by a hinged shaft 6.

In the present embodiment, four hinge frames 2 are provided, and in other embodiments, other numbers of hinge frames 2 may be provided.

Wherein, since the hinge frames 2 are hinged, the hinge frames 2 may not always be in a straight state, and accordingly, the pre-set direction may be a straight or curved direction.

The hinged shaft 6 is provided with a reset assembly 5, and after the hinge frame 2 at one end of the hinge shaft swings to a pre-set angle toward a pre-set outward flipping direction relative to the hinge frame 2 at the other end of the hinge shaft, the reset assembly 5 provides a reset force to the hinge frame 2, so that the corresponding hinge frame 2 has a motion tendency opposite to the pre-set outward flipping direction.

Figure 15:
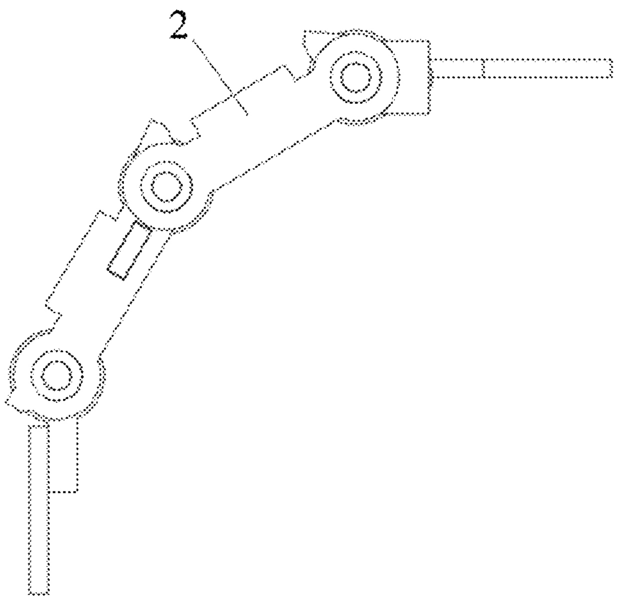
FIG. 15 is a view in an axial direction when the hinge structure is in an extreme inward folding state in the first specific embodiment of the hinge structure provided by the present disclosure.
Figure 21:
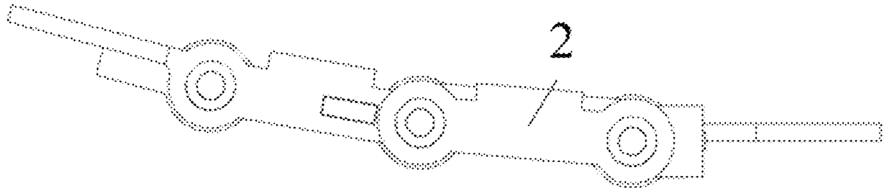
FIG. 21 is a view in the axial direction when the hinge frame connecting structure is flipped outward to an extreme outward flipping position in the first specific embodiment of the hinge structure provided by the present disclosure.
Figure 22:
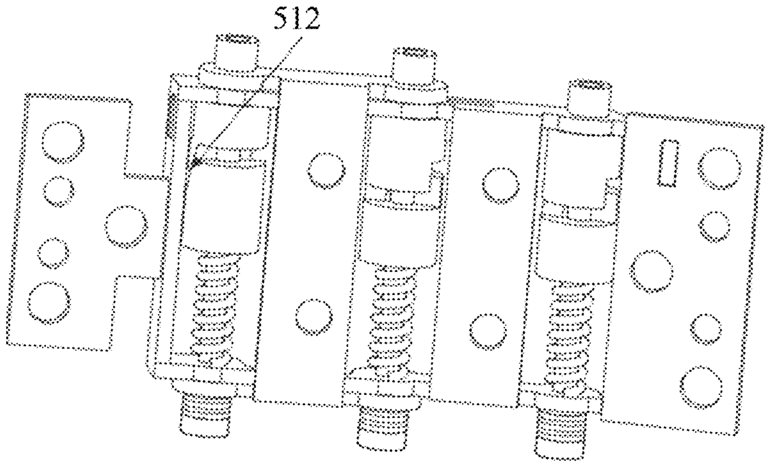
FIG. 22 is a structural illustration when the hinge frame connecting structure is flipped outward to the extreme outward flipping position in the first specific embodiment of the hinge structure provided by the present disclosure.

Wherein, for the pre-set outward flipping direction, the hinge frame 2 at one end of the hinge structure is taken as a fixed end, and the hinge frame 2 at the other end is taken as a movable end; the motion direction of the movable end relative to the fixed end from the bending extreme inward folding state (as shown in FIG. 15) to an unfolded, extreme outward flipping state (as shown in FIG. 21) is the pre-set outward flipping direction.

Wherein, during the process of the hinge structure flipping outward along the pre-set outward flipping direction, all the reset assemblies 5 may start to deform at the same time, or it may not all start to deform at the same time. The pre-set angle may be specifically defined as a threshold at which all reset assemblies 5 start to deform, the hinge structure continues flipping outward after flipping outward to this pre-set angle, and all reset assemblies 5 are in the deformed state. In the present embodiment, in the extreme inward folding state is at the pre-set angle, that is, as long as flipping outward, the reset assembly 5 correspondingly provides an inward folding reset force.

The hinged shaft 6 is provided with a damping elastic piece 7, and the damping elastic piece 7 presses against at least one hinge frame 2 so as to provide a damping force thereto when the corresponding hinge frame 2 swings.

When applied to smart glasses such as AR glasses, the hinge frames 2 at the two ends of the hinge structure are connected with the eyeglass frame 1 and the eyeglass temple 3 respectively, so that the eyeglass temple 3 is rotationally connected with the eyeglass frame 1 through the hinge structure, and the eyeglass temple 3 may be folded inward or flipped outward relative to the eyeglass frame 1. During the wearing process, the user swings the eyeglass temple 3 along the pre-set outward flipping direction, all the hinge frames 2 also moves correspondingly along the pre-set outward flipping direction, the deformation degree of the reset assembly 5 gradually increases, the eyeglass temple 3 maintains the tendency of the resetting movement along the pre-set folding inward direction, and the pre-set folding inward direction is opposite to the pre-set outward flipping direction, such that the two eyeglass glasses 3 may be pressed to the head and hold the head respectively, and the smart glasses may adapt to different head shapes for wearing, thereby increasing the applicability and comfort of wearing; at the same time, in the process of flipping the eyeglass temple 3 outward, the hinge frame 2 corresponding to the damping elastic piece 7 generates frictional force as the damping force to improve the use feeling.

In the present embodiment, the reset assembly 5 and the damping elastic piece 7 are uniformly provided on the hinged shaft 6, and thus can be directly positioned at the hinged shaft 6, which can be uniformly installed to facilitate the assembly of the hinge structure.

Further, a pressing force of the damping elastic piece 7 pressing against the corresponding hinge frame 2 is adjustable. Since the pressing force is adjustable, the damping force applied to the hinge frame 2 is adjustable, so that the use feeling can be adaptively improved as required.

Further, please refer to FIGS. 4 and 10-12, at least one pair of adjacent hinge frames 2 are respectively fixed with a mounting plate 21 to form a plate group. Wherein, the hinged shaft 6 is plugged along an axial direction into each mounting plate 21, and the damping elastic piece 7 presses against at least two adjacent mounting plates 21 which are respectively connected with two hinge frames 2, such that the pressed mounting plates 21 will generate frictional force when they rotate relative to each other, so as to provide damping force. The damping effect may be guaranteed by providing damping force by friction between mounting plates 21. Of course, in other embodiments, the frictional force may also be provided as the damping force by the relative rotation between the damping elastic piece 7 and the mounting plate 21 it touches.

Figure 10:
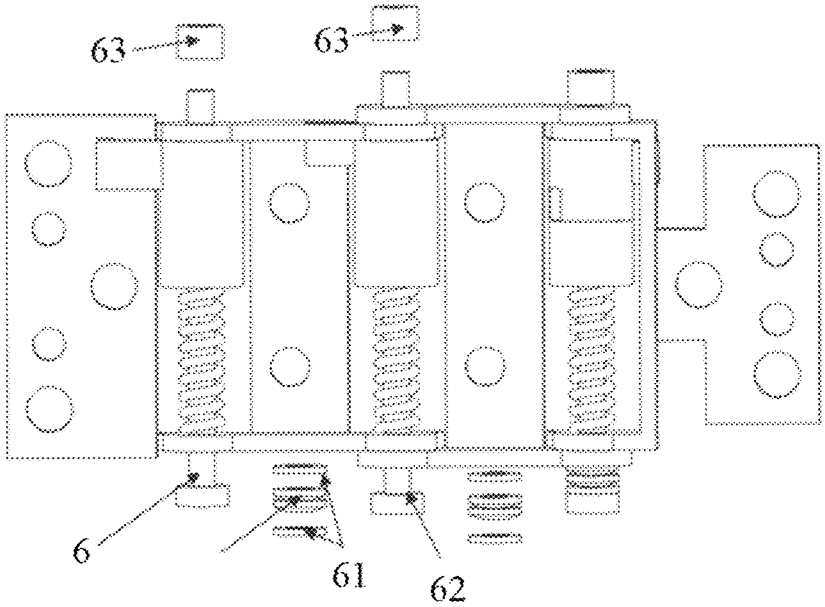
FIG. 10 is a third exploded view of the various hinge frame connecting structures in the first specific embodiment of the hinge structure provided by the present disclosure.
Figure 11:
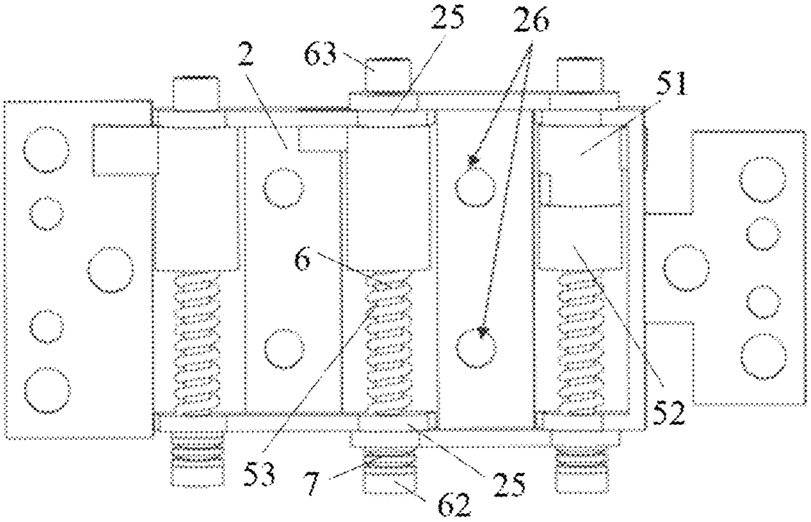
FIG. 11 is a schematic diagram of the various hinge frame connecting structures in the first specific embodiment of the hinge structure provided by the present disclosure.

Further, as shown in FIGS. 10 and 11, one end of the hinged shaft 6 in the axial direction is provided with an end cap 62, and the damping elastic piece 7 is positioned in the axial direction between one end of the plate group and the end cap 62. An axial spacing between the end cap 62 and the plate group is adjustable. By adjusting the axial spacing between the end cap 62 and the plate group, it is possible to adjust the pressing force of the damping elastic piece 7 applied to the hinge frame 2, which is easy to operate.

Further, as shown in FIG. 11, the other end of the hinged shaft 6 in the axial direction is a threaded rod which is screwed to a lock nut 63, and the plate group is sandwiched between the lock nut 63 and the end cap 62. Wherein, specifically, the damping elastic piece 7 is a disc spring sleeved on the hinged shaft 6, and may also be other springs. In addition, as shown in FIG. 10, the damping elastic piece 7 may be separated from the plate and from the end cap 62 by gaskets 61 sleeved on the hinged shaft 6.

In the present embodiment, the hinged shaft 6 is connected with the lock nut 63 after being installed on the elastic assembly, the damping elastic piece 7 and the mounting plate 21 in sequence along the axial direction, so as to complete the assembly of the components at the hinged shaft 6, which is easy to operate. In addition, by screwing the lock nut 63 to adjust the axial distance between the lock nut 63 and the end cap 62, the degree of pressing the damping elastic piece 7 can be adjusted, thereby adjusting the damping force. Of course, in other embodiments, a threaded plate hole consisting of threads may also be directly provided in the plate hole of one of the mounting plates 21, the threaded rod on the hinged shaft 6 is directly connected with the threaded plate hole, and by adjusting the position where the two are connected in the axial direction, the damping force of the damping elastic piece 7 can be adjusted.

Further, as shown in FIG. 11, between the at least one pair of adjacent hinge frames 2, all mounting plates 21 in the plate group are divided into two plate sub-groups 25 which are provided at two ends of the hinge frame 2 in the axial direction, and the reset assembly 5 is provided between the two plate sub-groups 25.

By providing the two plate sub-groups 25 at two ends of the hinge frame, it is possible to ensure that there is enough space between the two plate sub-groups 25 to install the reset assembly 5; at the same time, by filling the space with reset assembly 5, it is possible to improve the overall connection strength of the hinge structure.

Figure 12:
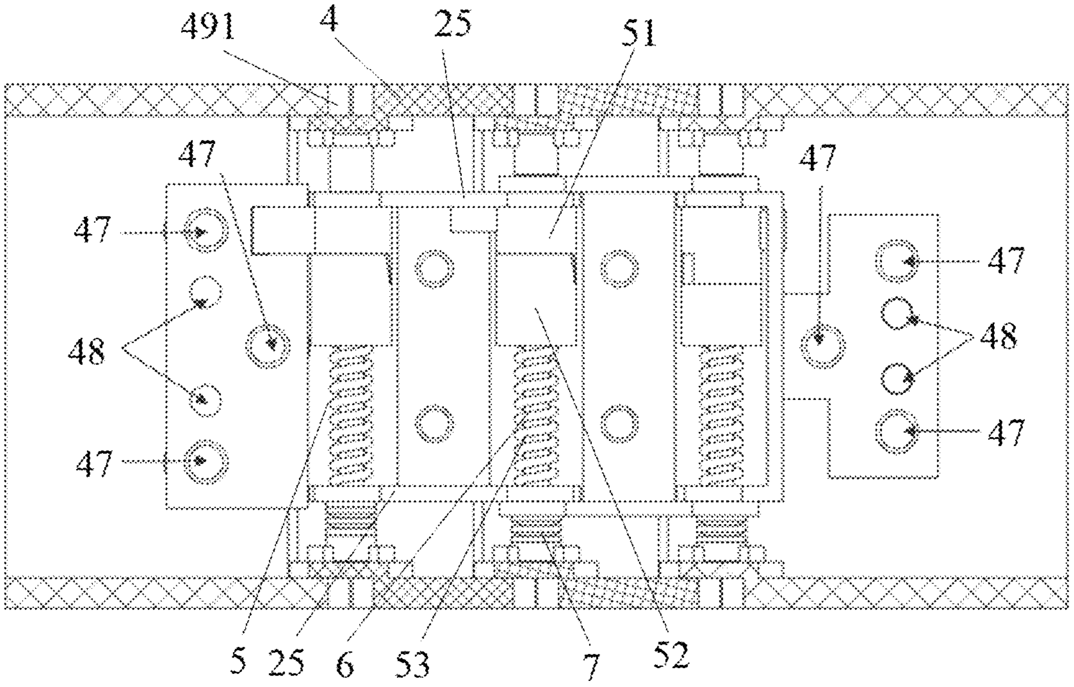
FIG. 12 is a sectional view of a first specific embodiment of the hinge structure provided by the present disclosure.

Further, as shown in FIGS. 11 and 12, in the at least one pair of adjacent hinge frame 2, one hinge frame 2 is fixedly connected with the hinged shaft 6, the reset assembly 5 comprising: a fixed block 51 fixed to the other hinge frame 2, a movable block 52 connected with the hinged shaft 6 in an axially sliding manner, and a reset elastic piece 53 for axially pressing the movable block 52 against the fixed block 51. After the hinge frame 2 at one end swings to the pre-set angle toward the pre-set outward flipping direction relative to the hinge frame 2 at the other end, the movable block 52, by fitting engagement with a slope between the movable block 52 and the fixed blocks 51, enables a corresponding hinge frame 2 to have a motion tendency opposite to the pre-set outward flipping direction.

Figure 19:
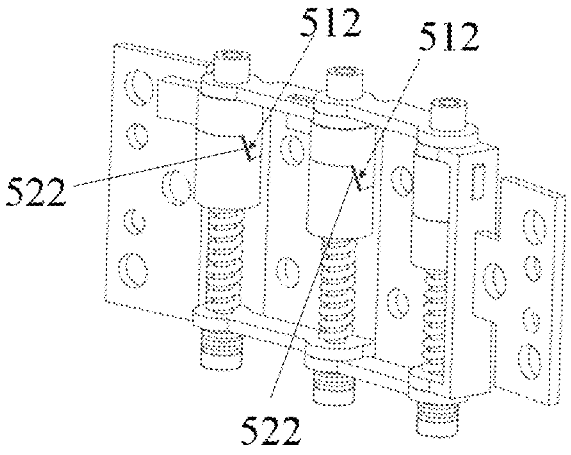
FIG. 19 is a first structural illustration when the hinge frame connecting structure is folded to the middle position in the first specific embodiment of the hinge structure provided by the present disclosure.
Figure 20:
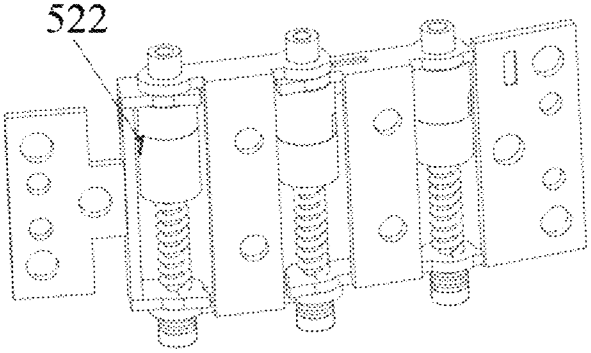
FIG. 20 is a second structural illustration when the hinge frame connecting structure is folded to the middle position in the first specific embodiment of the hinge structure provided by the present disclosure.

Wherein, specifically, as shown in FIG. 19, the fixed block 51 is provided with a fixed slope 512 that is inclined with respect to the axial direction, and the movable block 52 is provided with a movable slope 522 that is inclined with respect to the axial direction, so that the fixed block 51 and the movable block 52 are held in close contact with each other. When the movable block 52 rotates along with the hinged shaft 6, the fixed block 51 is relatively stationary, and when pushed by the fixed slope 512, the movable block 52 moves axially away from the fixed block 51 and compresses the reset elastic piece 53. The elastic force of the reset elastic piece 53 generates an inward folding reset force to the corresponding hinge frame through the steering ability of the movable slope 522 and the fixed slope 512.

Wherein, to achieve the axial movement of the movable block 52 without keeping the circumferential position unchanged along with fixed block 51, specifically, the movable block 52 may be slidingly connected with the hinged shaft 6 in the axial direction through the key structure. Alternatively, two ends of the reset elastic piece 53 are fixedly connected with the movable block 52 and the mounting plate 21 respectively, and by using the twisting reset force of the reset elastic piece 53, the movable block 52 will not be excessively rotated, but can rotate with the hinged shaft 6.

Figure 9:
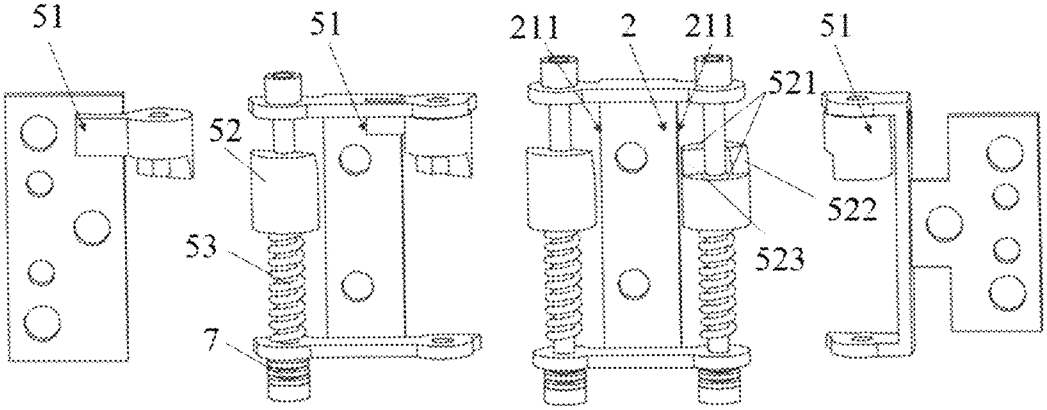
FIG. 9 is a second exploded view of the various hinge frame connecting structures in the first specific embodiment of the hinge structure provided by the present disclosure.

Wherein, as shown in FIGS. 9 and 10, the fixed block 51 is rotatably sleeved on the hinged shaft 6; meanwhile, the fixed block 51, the movable block 52, and the reset elastic piece 53 are sequentially sleeved on the hinged shaft 6 in the axial direction.

Through the slope cooperation, the axial pressure applied to the movable block 52 from the reset elastic piece 53 may be converted into a pressure perpendicular to the axial direction, so as to generate a reset force perpendicular to the axial direction to the hinge frame 2 performing the outward flipping movement, such that the hinge frame 2 performing the outward flipping movement has a motion tendency of inward folding reset, which may sufficiently allocate the axial space at the hinged shaft 6 to complete the assembly of the fixed block 51, the movable block 52, the reset elastic piece 53 and the damping elastic piece 7, thereby further facilitating the assembly.

Further, the fixed block 51 comprises a fixed flat surface 511 perpendicular to the axial direction, and the movable block 52 comprises a movable flat surface 521 perpendicular to the axial direction. In an extreme inward folding state, the fixed flat surface 511 and the movable flat surface 521 are correspondingly abutted along the axial direction.

Wherein, as shown in FIGS. 3-8, the fixed block 51 is fixedly provided with a positioning bar 514, the hinge frame 2 is provided with a positioning groove 22, and the positioning bar 514 is positioned and inserted into the positioning groove 22, and is welded with the positioning groove 22, so that the fixed block 51 and the hinge frame 2 form a whole. The fixed block 51 and the hinge frame 2 are welded to each other, which is simple to manufacture. In addition, the fixed block 51 and the hinge frame 2 are formed by sheet metal stamping or simple machining, which can reduce costs.

Figure 4:
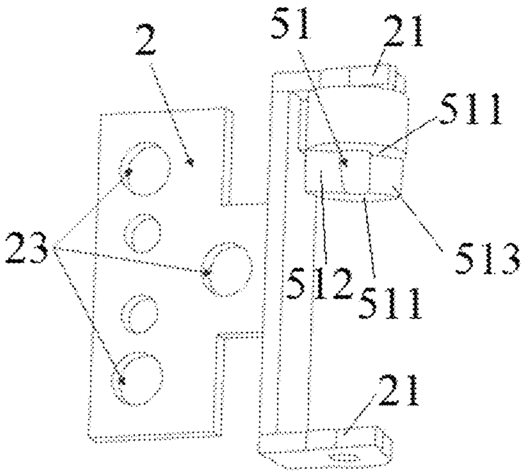
FIG. 4 is a structural illustration of an end hinge frame in the first specific embodiment of the hinge structure provided by the present disclosure.
Figure 5:
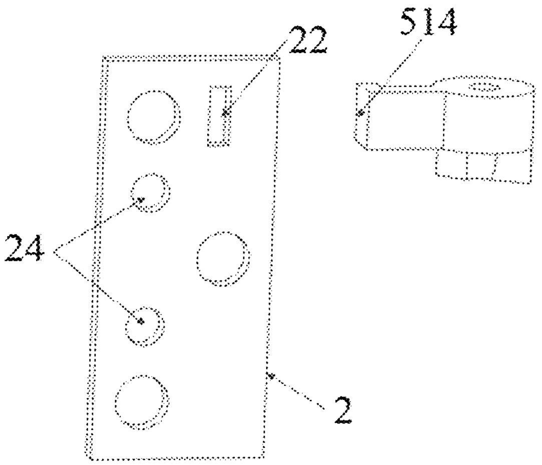
FIG. 5 is an exploded view of another end hinge frame in the first specific embodiment of the hinge structure provided by the present disclosure.
Figure 6:
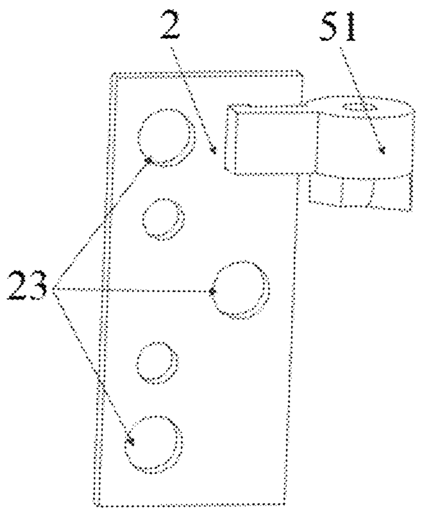
FIG. 6 is a structural illustration of another end hinge frame in the first specific embodiment of the hinge structure provided by the present disclosure.
Figure 7:
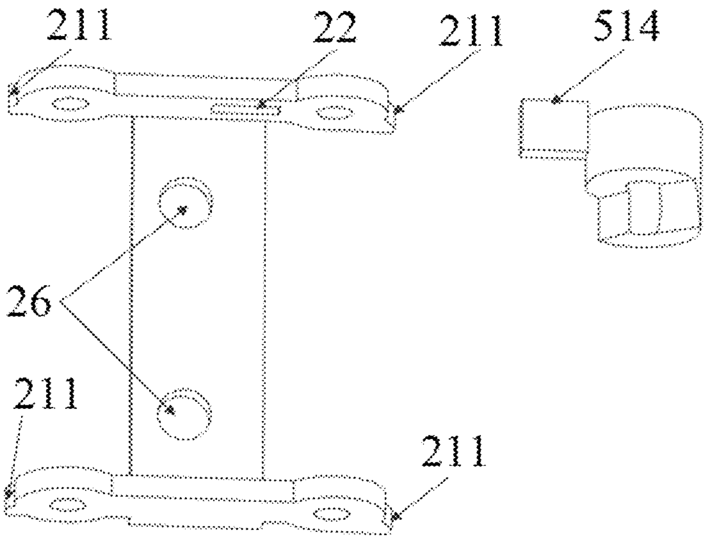
FIG. 7 is an exploded view of a middle hinge frame in the first specific embodiment of the hinge structure provided by the present disclosure.
Figure 8:
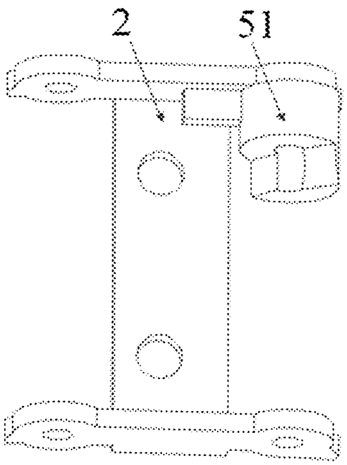
FIG. 8 is a structural illustration of the middle hinge frame in the first specific embodiment of the hinge structure provided by the present disclosure.

Wherein, as shown in FIGS. 4 and 9, the fixed flat surface 511 and the fixed slope 512 on the fixed block 51 are butted in the circumferential direction, and the movable flat surface 521 and the movable slope 522 on the movable block 52 are butted in the circumferential direction. Specifically, in the extreme inward folding state as shown in FIG. 15, the fixed flat surface 511 and the movable flat surface 521 are in contact with each other in the axial direction; as the movable end of the hinge structure swings along the pre-set outward flipping direction relative to the fixed end, the movable block 52 rotates while the position of the fixed block 51 remains unchanged, and the movable slope 522 slides against the fixed slope 512, such that when the movable block 52 rotates along with the hinged shaft 6, the movable slope 522 drives the movable block 52 to move in the axial direction, which increases the degree of compressing the elastic piece 53, and also increases the driving force for driving the corresponding hinge frame 2 to perform inward folding reset. In addition, the axial distance between the flat movable surface 521 and the fixed flat surface 511 is also increased.

Figure 16:
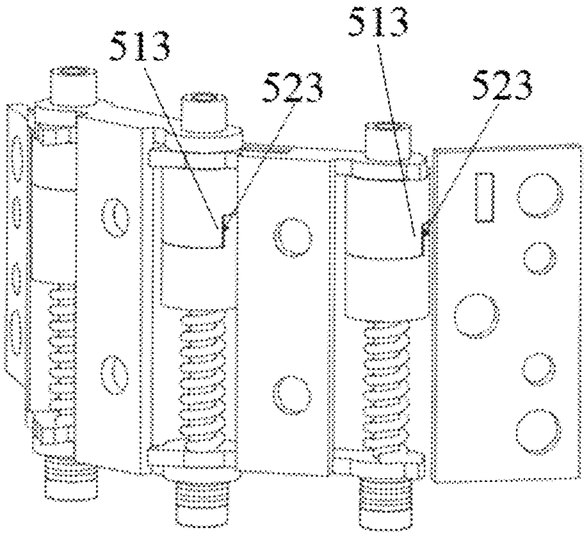
FIG. 16 is a first structural illustration when the hinge frame connecting structure is in the extreme inward folding state in the first specific embodiment of the hinge structure provided by the present disclosure.
Figure 17:
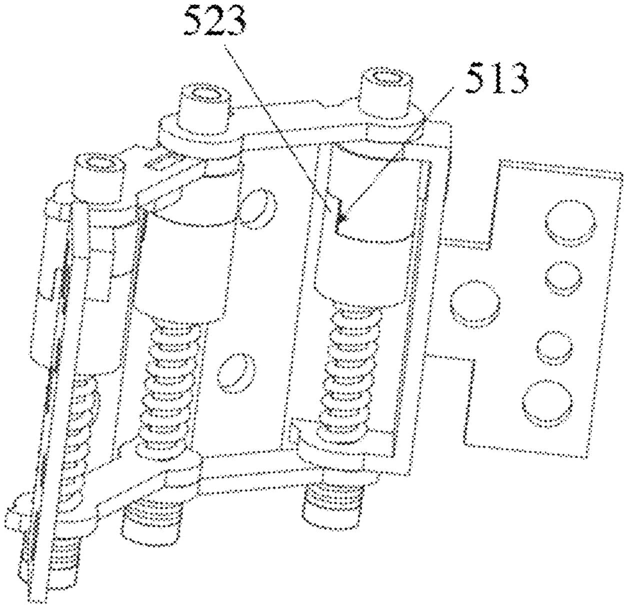
FIG. 17 is a second structural illustration when the hinge frame connecting structure is in the extreme inward folding state in the first specific embodiment of the hinge structure provided by the present disclosure.
Figure 18:
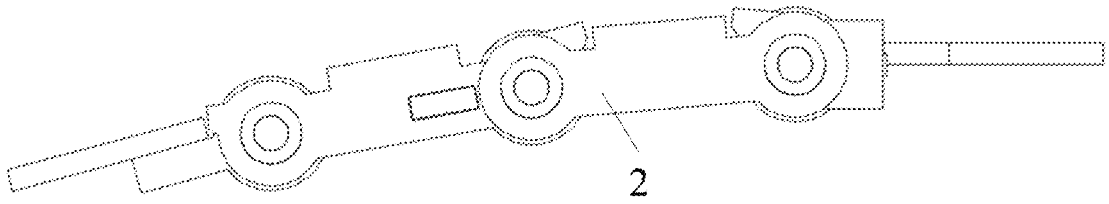
FIG. 18 is a view in the axial direction when the hinge frame connecting structure is folded to the middle position in the first specific embodiment of the hinge structure provided by the present disclosure.

In addition, as shown in FIG. 16, the fixed block 51 is also provided with a fixed inner positioning surface 513 parallel to the axial direction, and the movable block 52 is provided with a movable inner positioning surface 523 parallel to the axial direction, and in the extreme inward folding state, the fixed inner positioning surface 513 and movable inner positioning surface 523 are matched along the circumferential direction, so that the corresponding hinge frame 2 can no longer continue to rotate inward and perform inward folding limit. In addition, as shown in FIG. 9, the hinge frame 2 is provided with an outer restraining surface 211, and in the extreme outward flipping state, the outer restraining surfaces 211 between adjacent hinge frames 2 are abutted to avoid the corresponding hinge frame 2 from continuing outward flipping.

In the present embodiment, due to fitting engagement of the fixed flat surface 511 and the movable flat surface 521, the installation stability between the movable block 52 and the fixed block 51 can be improved when the smart glass is not used and the hinge structure is in the extreme inward folding state.

Figure 23:
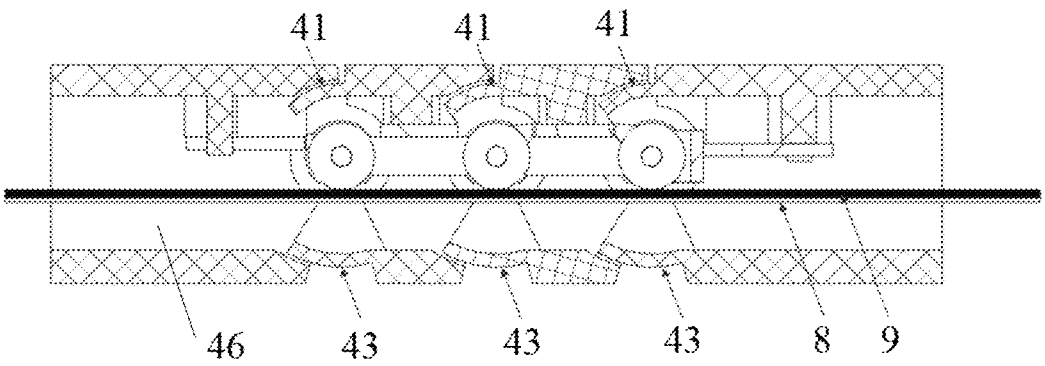
FIG. 23 is a sectional view of the first specific embodiment of the hinge structure provided by the present disclosure when it is flipped outward to a linear state.
Figure 24:
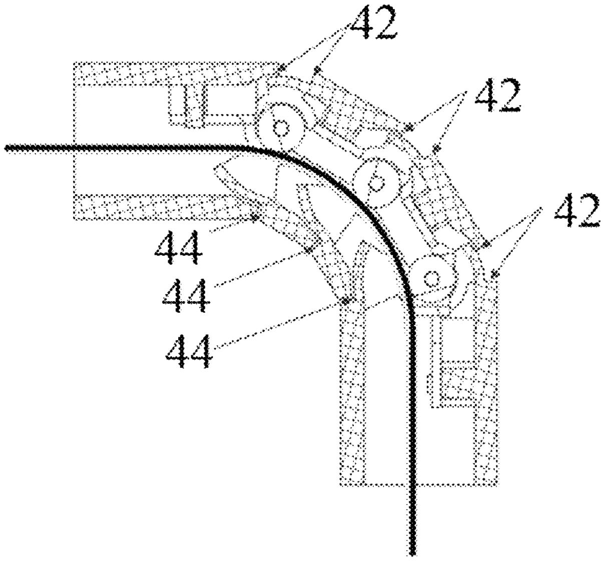
FIG. 24 is a sectional view of the first specific embodiment of the hinge structure provided by the present disclosure when it is in the extreme inward folding state.
Figure 25:
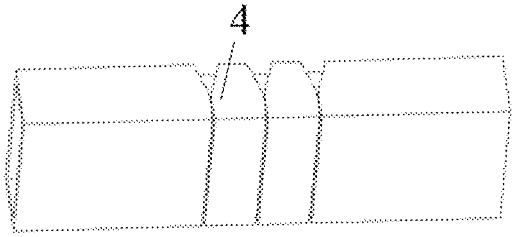
FIG. 25 is a structural illustration in a first direction when the hinge cover connecting structure is in the extreme outward flipping state and in the extreme inward folding state in the first specific embodiment of the hinge structure provided by the present disclosure.
Figure 26:
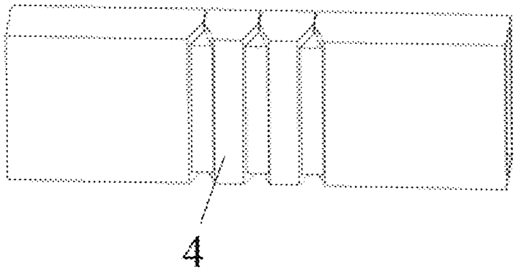
FIG. 26 is a structural illustration in a second direction when the hinge cover connecting structure is in the extreme outward flipping state and in the extreme inward folding state in the first specific embodiment of the hinge structure provided by the present disclosure.
Figure 27:
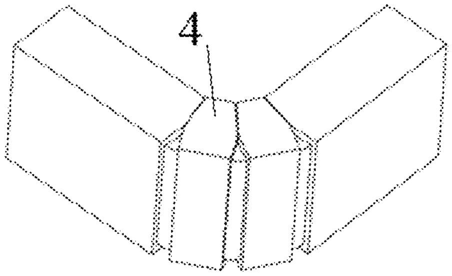
FIG. 27 is a structural illustration in a first direction when the hinge cover connecting structure is in the extreme inward folding state and in the extreme outward flipping state in the first specific embodiment of the hinge structure provided by the present disclosure.
Figure 28:
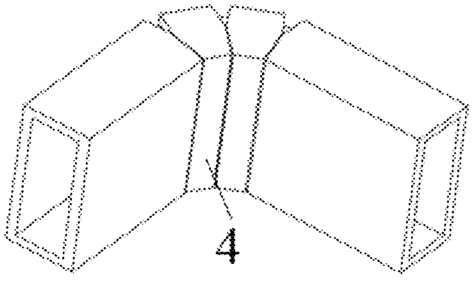
FIG. 28 is a structural illustration in a second direction when the hinge cover connecting structure is in the extreme inward folding state and in the extreme outward flipping state in the first specific embodiment of the hinge structure provided by the present disclosure.

Further, as shown in FIGS. 23-24, the hinge structure of smart glasses further comprises ring-shaped hinge covers 4, an outer side of each hinge frame 2 is respectively sleeved and fixed with one hinge cover 4, and all the hinge covers 4 are connected along the pre-set direction to form a mounting passage 46. By sleeving the hinge cover on the outer side of the corresponding hinge frame 2, the hinge frame 2 may be protected. Specifically, each hinged shaft 6 is fixed to different hinge cover 4. By fixing the hinge frame 2 and the hinged shaft 6 to the hinge cover 4 respectively, the hinge frame 2 and the hinged shaft 6 can be fixedly connected without additionally providing a separate fixing structure on the hinged shaft 6 to fix the hinged shaft 6. The hinged shaft 6 can be fixed while assembling the hinge frame 2 on the hinge cover 4, which further facilitates the assembly of the hinged shaft 6.

Further, as shown in FIG. 12, the hinge frame 2 is provided with an axial trough 492, the hinged shaft 6 being inserted into the axial trough 492 and fixedly connected thereto by interference fit; this facilitates a fixed connection between the hinged shaft 6 and the corresponding hinge frame. Of course, in other embodiments, the hinged shaft 6 can be fixed to the corresponding hinge frame 2 by other means such as screwing connection.

Wherein, when the hinge structure is applied to the smart glasses, the two hinge covers 4 at the ends are the end hinge covers, and the remaining hinge covers 4 in the middle are the middle hinge covers. The two end hinge covers are integrally provided to the housings of the eyeglass frame 1 and the eyeglass temple 3, respectively.

Specifically, for the end hinge frame 2, as shown in FIGS. 3-6 and 12, it is provided with a screw hole 23 and a positioning hole 24, which are fixedly connected with the end hinge cover through a screw post 47 and a positioning post 48. In addition, one of the end hinge covers is provided with an axial trough 492 to fixedly connect to the hinged shaft 6, while the other end hinge cover is not fixedly connected to the hinged shaft 6.

Figure 13:
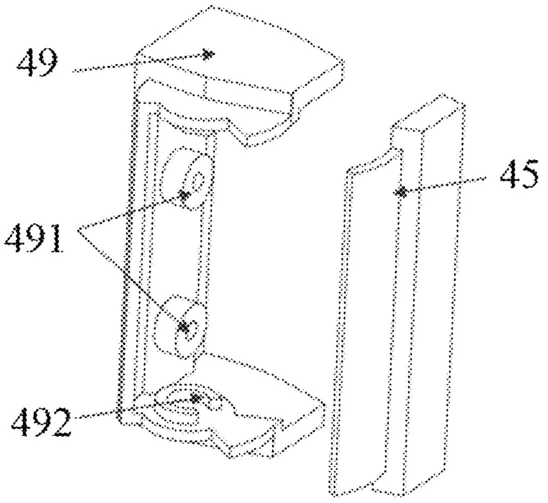
FIG. 13 is an exploded view of a hinge cover in the first specific embodiment of the hinge structure provided by the present disclosure.

Specifically, as shown in FIG. 13, the middle hinge cover comprises a first side plate 49 and a second side plate 45 which is docked with the first side plate 49 to form a ring structure. The side of the first side plate 49 facing second side plate 45 is provided with a plug structure 491 which is plugged and fixed with the hinge frame 2. Specifically, in the present embodiment, as shown in FIG. 11, the plug structure 491 is a pint, and the hinge frame 2 is correspondingly provided with a connecting hole 26 to be plugged and fixed with the pin. In other embodiments, the plug structure 491 can also be a socket, and the hinge frame 2 is correspondingly provided with a plug column to be plugged and connected with the socket.

When assembling the hinge frame 2 and the corresponding middle hinge cover, separating the first side plate 49 and the second side plate 45 first; installing the hinge frame 2 on the first side plate 49 which are plugged and fixed, which is specifically a screwing connection, so as to realize the limit between the hinge frame 2 and the middle hinge cover; then, buckling the second side plate 45 with the first side plate 49.

The mating of the hinge frame 2 and the plug structure 491 enables the hinge frame 2 and the middle hinge cover to be reliably positioned in a pre-set direction. In addition, the mating connection of the split first side plate 49 and second side plate 45 forms the middle hinge cover, which facilitates its assembly with the hinge frame 2 in the middle hinge cover.

Figure 14:
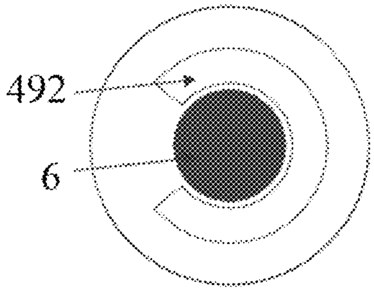
FIG. 14 is an assembly diagram of the hinged shaft and the hinge cover in the first specific embodiment of the hinge structure provided by the present disclosure.

Specifically, as shown in FIGS. 13-14, the first side plate 49 has a C-shaped axial trough 492, and the opening of the axial trough 492 faces the second side plate 45. Preferably, the first side plate 49 is a U-shaped plate with axial troughs 492 on the two opposite walls of the U-shaped plate, and the second side plate 45 is mounted on the lateral opening of the first side plate 49. Wherein, each middle hinge cover is provided with the axial trough 492 for fixedly connecting the hinged shaft 6.

During installation of the hinge frame 2 into the first side plate 49 through the lateral opening of the first side plate 49, the hinged shaft 6 can enter and be fixed into the axial trough 492 synchronously through the opening of the axial trough 492, specifically in interference fit, as to position the hinged shaft 6 by means of the axial trough 492 to ensure that the hinged shaft 6 does not come loose, such that a synchronous positioning of the corresponding hinged shaft 6 and the hinge frame 2 is achieved by means of the middle hinge cover, thereby ensuring a synchronous swinging of the hinge frame 2 with the middle hinge cover.

Further, as shown in FIG. 23, a flexible circuit board 8 and a flexible thermally conductive material 9 are provided in the mounting passage 46. The flexible circuit board 8 and flexible thermally conductive material 9 can be connected with a relevant component and a heat source and a soaking member on the eyeglass temple 3 side and eyeglass frame 1 side, respectively. In this way, the relevant hardware, heat source and soaking structure of the eyeglass temple 3 side and the eyeglass frame 1 side may be connected, such that data of the whole machine can be communicate so as to achieve the heat soaking effect of the whole machine. Wherein, the flexible thermally conductive material 9 may be a material with high thermal conductivity and multiple bends, such as flexible graphite sheets and flexible graphene.

In addition, the hinge structure comprises at least two hinge frames 2, and accordingly comprises an equal number of rotational joints. Through this multi-joint setting, the total swing of the hinge structure is shared by all the rotational joints, which may increase the bending radius of the hinge cover 4, so that the length of the bending area between the hinge covers 4 is very small before and after bending. When the hinge structure swings, for example, when swinging 90°, the rotational joint at the right end of the four rotational joints is fixed, and the remaining rotational joints swing 30° relative to the adjacent rotational joints at the right end. Finally, the rotational joint at the leftmost end swings 90° relative to the initial position. By increasing the bending radius, it is possible to increase the swing reliability of the flexible circuit board 8 and the flexible thermally conductive material 9 inside the mounting passage 46, thus reaching the mass production level. Of course, in other embodiments, there may also be provided the hinge frame 2 in a different quantity. The more the number of joints, the smaller the rotation angle of each joint.

In addition, to limit the swing ranges of each hinge structure and each hinge cover 4 so as to prevent bending angles and bending radii of the internal flexible circuit board 8 and the thermally conductive material 9 from being affected by excessive rotation angle of a single joint of rotational joints, a rotation-limiting structure may be provided between adjacent hinge covers 4. As shown in FIG. 24, between the adjacent hinge covers 4, the first hinge cover 4 is provided with an inner positioning surface 44 and an outer positioning surface 42 which cooperate with the second hinge cover 4, so that the first hinge cover 4 can at most fold the inner positioning surface 44 inward relative to the second hinge cover 4 to rotate to be abutted against the second hinge cover 4, and at most flip the outer positioning surface 42 outward to rotate to be abutted against the second hinge cover 4, which cooperates with the abutment between the movable block 52, and the fixed block 51 and the hinge frame 2 to achieve double limiting. Alternatively, each hinge cover 4 can rotate in the same angle range relative to the adjacent hinge cover 4, such as 30°, or 45°.

Further, as shown in FIG. 23, between the adjacent hinge covers 4, one of them is provided with a connecting convex 43 while the other is provided with a connecting recess 41, and the connecting recess 41 is rotatably sleeved on the outer side of the connecting convex 43 to shield the connecting convex 43, and each hinge cover 4 rotates synchronously with the hinge frame 2 therein. With the shielding of the connecting convex 43 by the connecting recess 41, it can be ensured that the mounting passage 46 is always fully shielded by the hinge cover 4 and the butting portion of the hinge cover 4 during the rotation, which ensures that the components mounted in the mounting passage 46 are not exposed, thereby ensuring safety and aesthetics.

When the hinge structure provided by the present embodiment is applied to smart glasses, the working principle is as follows: as shown in FIG. 12, the left end of the hinge structure is connected with the eyeglass frame 1, and the right end of the hinge structure is connected with the eyeglass temple 3. When not in use, the hinge structure is in the extreme inward folding state. When flipping the eyeglass temple 3 outward, the movable block 52 is moved downward due to the slope between the fixed block 51 and the corresponding movable block 52, the fixed block 51 generates a reset force on the movable block 52 in the inward folding direction, and the reset force gradually increases. During rotation, the damping elastic piece 7 also provides damping force for improving the use feeling.

In the present embodiment, by providing the reset assembly 5 and the damping elastic piece 7 on the hinged shaft 6, it is possible to achieve the versatility of the hinged shaft 6 and facilitate the assembly; the hinged structure is provided with a plurality of sheet metal parts or simple machining parts, a movable block 52, a disc spring, a spring and the like, which are all simply processed, simply bent and simply welded parts with high generalization, which greatly reduces the cost and difficulty of processing and manufacturing; the hinged shaft 6 is designed with the damping elastic piece 7, which is locked with the lock nut 63, and the elastic force of which is adjusted by adjusting the lock nut 63, so that a frictional force is generated when the hinged shaft 6 is rotated to further provide a damping force, causing that hinge structure has a damping effect.

Of course, in the present embodiment, the reset assembly 5 may be provided in another way, for example, the reset assembly 5 comprises a pressing structure and an elastic member, which are sequentially arranged along a pre-set direction and are respectively connected with two adjacent hinge frames 2. When flipping the hinge frame 2 outward, the pressing structure presses the elastic member to deform, so that the outward flipping hinge frame 2 has a tendency of inward folding movement, thereby providing the eyeglass temple 3 with a pressing force toward the head.

It should be noted that when an element is referred to as being "fixed to" or "arranged on" another element, it can be directly on another element, or there may be an intervening element therebetween. When an element is referred to as being "connected" to another element, it can be directly connected to another element or intervening elements may also be present.

An orientation or positional relationship indicated by terms "center", "upper", "lower", "left", "right", "vertical", "horizontal", "inner", "outer", is based on the orientation or positional relationship shown in the accompanying drawings, and is only for convenience of describing the present disclosure and simplifying the description, rather than indicating or implying that a device or element referred to must be provided with a particular orientation, be constructed and operate in a particular orientation, and therefore should not be understood as a limitation to the present disclosure. In addition, terms "first", "second" and "third" are only used for descriptive purposes and should not be understood as indicating or implying relative importance or implying a number of indicated technical features.

Unless otherwise defined, all technical and scientific terms used herein have the same meaning as commonly understood by one of ordinary skill in the art to which this disclosure pertains. The terminology used herein in the description of the present disclosure is for the purpose of describing particular embodiments only and is not intended to be limiting of the present disclosure.

Each embodiment in the present specification is described in a progressive manner, and each embodiment focuses on the differences from other embodiments, and the same and similar parts of each embodiment can be referred to each other.

The hinge structure of smart glasses provided by the present disclosure has been described in detail above. Specific examples are applied herein to illustrate the principles and implementations of the present disclosure, and the description of the above embodiment is only for the purpose of helping to understand the method of the present disclosure and its core ideas. It should be noted that, for those of ordinary skill in the art, on the premise of not departing from the principles of the present disclosure, certain improvements and modifications may also be made to the present disclosure, and these improvements and modifications also fall within the scope of protection of the present disclosure.

Each embodiment in this specification is described in a parallel or progressive manner, and each embodiment focuses on its differences from other embodiments, and the similar parts between each embodiment can refer to each other. For the device disclosed in the embodiments, the description is relatively simple because the device corresponds to the method disclosed in the embodiments, and the relevant points can be found in the description of the method.

The invention claimed is:

1. A hinge structure for smart glasses, comprising at least first and second hinge frames provided along a pre-set direction, wherein the first and second hinge frames are hinged by a hinged shaft;

the hinged shaft is provided with a reset assembly, such that after the first hinge frame at a first end of the hinge shaft swings to a pre-set angle toward a pre-set outward flipping direction relative to the second hinge frame at a second end of the hinge shaft, the reset assembly provides a reset force to the first hinge frame, so that the corresponding hinge frame has a motion tendency opposite to the pre-set outward flipping direction;

the hinged shaft is provided with a damping elastic piece, and the damping elastic piece presses against at least the first or the second hinge frames to provide a damping force thereto when the corresponding hinge frame swings;

at least the first and the second hinge frames are respectively fixed with a mounting plate to form a plate group, the hinged shaft is plugged along an axial direction into each of the mounting plates, and the damping elastic piece presses against at least two of the mounting plates that are adjacent and which are respectively connected with the first and second hinge frames.

2. The hinge structure of smart glasses according to claim 1, wherein a pressing force of the damping elastic piece pressing against the corresponding hinge frame is adjustable.

3. The hinge structure of smart glasses according to claim 1, wherein the first end of the hinged shaft in the axial direction is provided with an end cap, and the damping elastic piece is positioned in the axial direction between one end of the plate group and the end cap; an axial spacing between the end cap and the plate group is adjustable.

4. The hinge structure of smart glasses according to claim 3, wherein the second end of the hinged shaft in the axial direction is a threaded rod which is screwed to a lock nut, and the plate group is sandwiched between the lock nut and the end cap.

5. The hinge structure of smart glasses according to claim 1, wherein between the at least the first and second hinge frames, mounting plates in the plate group are divided into two plate sub-groups which are provided at two ends of the hinge frames in the axial direction, and the reset assembly is provided between the two plate sub-groups.

6. The hinge structure of smart glasses according to claim 1, wherein in the at least the first and second hinge frame, the first hinge frame is fixedly connected with the hinged shaft, the reset assembly comprising: a fixed block fixed to the second hinge frame, a movable block connected with the hinged shaft in an axially sliding manner, and a reset elastic piece for axially pressing the movable block against the fixed block, and after the first hinge frame at the first end swings to the pre-set angle toward the pre-set outward flipping direction relative to the second hinge frame at the second end, the movable block, by fitting engagement with a slope between the movable block and the fixed blocks, so that a corresponding hinge frame has a motion tendency opposite to the pre-set outward flipping direction.

7. The hinge structure of smart glasses according to claim 6, wherein the fixed block comprises a fixed flat surface perpendicular to the axial direction, and the movable block comprises a movable flat surface perpendicular to the axial direction; in an inward folding state, the fixed flat surface and the movable flat surface are adaptable to correspondingly be abutted along the axial direction.

8. The hinge structure of smart glasses according to claim 6, further comprising ring-shaped hinge covers, an outer side of each of the first and second hinge frame is respectively sleeved and fixed with one hinge cover, and hinge covers are connected along the pre-set direction to form a mounting passage.

9. The hinge structure of smart glasses according to claim 8, wherein each of the first and second hinge frame is provided with an axial trough, the hinged shaft being inserted into the axial trough and fixedly connected thereto by an interference fit.

* * * * *